April 29, 1969   C. G. REDERER ET AL   3,441,339
LENS HOLDING ASSEMBLY
Filed Jan. 7, 1966

CARL G. REDERER
GERALD L. JENKINS
INVENTORS

BY F. M. Emerson Holmes
Leonard T. Treash, Jr.
ATTORNEYS

United States Patent Office 3,441,339
Patented Apr. 29, 1969

3,441,339
LENS HOLDING ASSEMBLY
Carl G. Rederer and Gerald L. Jenkins, Rochester, N.Y., assignors to Eastman Kodak Company, Rochester, N.Y., a corporation of New Jersey
Filed Jan. 7, 1966, Ser. No. 519,371
Int. Cl. G02b 7/10
U.S. Cl. 350—255                                          5 Claims

ABSTRACT OF THE DISCLOSURE

A lens holding assembly in which a threaded spring held insert secured to the inside surface of a lens housing biases the engaged screw thread surface of a lens holder toward two arcuately spaced threaded inserts secured to the inside surface of the housing members.

---

This invention relates to lens holding assemblies. More specifically, this invention relates to lens holding assemblies for photographic lenses in which a lens mount is held in a housing by cooperating screwthreads. It includes, but is not limited to, the type of assembly in which the focus adjustment of the lens is effected by rotating the mount within the screwthreads of the housing.

If considerable attention is given to the precision of the design and manufacture of a lens, then a similar amount must be given to the lens mounting. Similarly, the attachment between the mount and the housing must be equally precise. A small amount of tilt, vertical misalignment, or inaccurate spacing in the mount can completely eliminate the preciseness of the instrument.

In the case of a lens mount which is held in its housing by cooperating screwthreads, precise axial alignment, spacing, and freedom from tilt has heretofore been obtainable only be carefully machined, and therefore costly, screwthreads on both the housing and the mount. This item is a major factor in making the cost of lens assembly and mount often more expensive than the cost of the lens elements.

It is an object of this invention to provide a lens assembly in which the mount and housing are held together by cooperating screwthreads but in which machining of the screwthreads on the housing is eliminated and the preciseness necessary in machining the screwthreads on the mount is sharply reduced.

It is another object of this invention to provide a lens assembly of the type described in which preciseness in spacing and tilt is comparable to that of machined type and in which the play between the housing and the mount is greatly reduced.

These and other objects are accomplished by replacing the machined threads on the inside of the housing with several arcuately spaced threaded inserts preferably of a moldable material such as plastic. The mount is then held snugly by resiliently forcing, by a spring or other suitable means, one or more inserts against the mount. This in turn forces the mount against at least two of the other inserts. In a preferred embodiment of the invention a spring and its adjustable insert can be arcuately displaced for adjusting tilt within factory tolerances.

The remarkable thing about this device is that precision in regard to tilt and spacing without appreciable play is repeatably obtained at a cost of less than 20 percent of that of an assembly with screwthreads machined to comparable preciseness.

Figure 1:
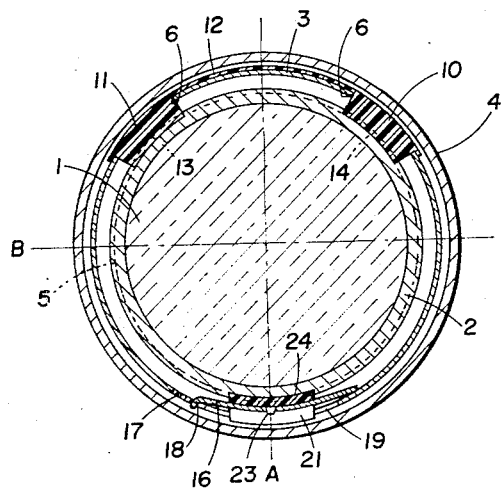
FIG. 1 is a cross sectional end view of a lens holding assembly constructed according to the invention.
Figure 2:
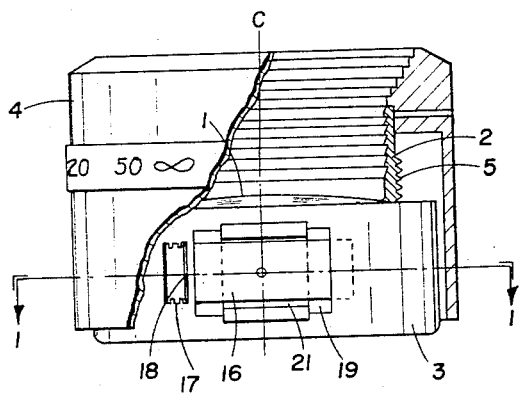
FIG. 2 is a bottom view partially cut away of the lens holding assembly shown in FIG. 1.
Figure 3:
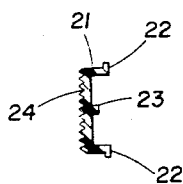
FIG. 3 is a side view of an adjustable plastic insert shown in FIGS. 1 and 2.

According to FIGS. 1, 2 and 3 a lens or lens component 1 is held in a cylindrical lens mount 2, the inside detail of which is not shown. On the outside of the lens mount 2 are screwthreads 5. A focus adjusting member 4 is attached to the lens mount 2.

To explain the way in which this invention overcomes lens mount tilt, three axes A, B and C are shown in FIGS. 1 and 2. Axis C is the optical axis of the lens. Axes A and B are shown as the azimuthal tilt axis and the elevational tilt axis, respectively. Since a particular vertical or horizontal orientation is not important to the practice of the invention, they shall be referred to only as tilt axis A and tilt axis B.

A lens housing 3 contains slots 6 for receiving at least two inserts 10 and 11 having screwthreads 13 and 14 on their inside surfaces. These threaded inserts are preferably molded into the lens housing and may include a connecting piece of material 12. One advantage gained by molding these inserts into the housing is that close accuracy between screwthreads 13 and screwthreads 14 can be obtained. Although factory tolerances may vary the construction of the housing itself or the distance apart of these two inserts, they will always act as though symmetrical about tilt axis A as seen in FIG. 1.

An adjustable plastic insert 21 having screwthreads 24 on its inside surface is positioned in an area generally opposite that of the fixed inserts 10 and 11. It is loosely held to the housing 3 by a slot 19 in the housing and ears 22 on the insert. A leaf spring 16 or other resilient means tends to push the screwthreads 24 away from the housing 3 toward the center of the lens 1. The screwthreads 13, 14 and 24 on the inserts are made to cooperate with the screwthreads 5 on the lens mount. The lens 1 may then be focused by turning the focus adjusting member 4 causing the lens mount to turn within the threaded inserts and be displaced along optical axis C.

When the lens mount 2 is screwed into place, the spring compels a snug fit by forcing the adjustable insert 21 against the lens mount 2 which in turn is forced against the fixed inserts 10 and 11. The moldable symmetry of the fixed inserts together with the spring force effectively eliminates tilt around tilt axis A even though the precision of the insert screwthreads 13, 14 and 24 relative to the mount screwthreads 5 is poor.

In the preferred embodiment of the device tilt around tilt axis B is eliminated by providing for a simple factory adjustment of the leaf spring 16. Slots 17 in the housing are positioned to receive a protrusion 18 of the leaf spring 16. These slots are arcuately displayed so that the leaf spring can assume any of several arcuate positions. A protrusion 23 on the adjustable insert 21 fits into a slot in the leaf spring 16 thereby providing a means for preventing movement of the adjustable insert independent of the leaf spring. Thus, by altering the arcuate position of the leaf spring using the slots 17 the position of the adjustable insert 21 can be changed to effectively adjust the tilt around tilt axis B. The snugness of fit effected by the leaf spring similarly allows an accurate spacing adjustment of the lens mount along the optical axis C.

With the use of this arrangement not only have machined screwthreads on the inside of the lens housing been eliminated and replaced by much less expensive molded inserts, but the preciseness necessary in the machining of the screwthreads on the lens mount has been much reduced. This invention is especially well adapted to lens designs in which the front component is moved for focusing. It is best used on lens components in which tilt and snugness of fit errors are more crucial than vertical displacement errors. In both of these regards it is well adapted to certain zoom lenses.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. An assembly for a lens or a lens component, said assembly comprising
   (a) a lens mount having screwthreads on an outside surface thereof;
   (b) a lens housing for receiving said lens mount;
   (c) at least three arcuately spaced inserts positioned between said housing and said outside surface of said mount, said inserts having screwthreads which cooperate with the screwthreads of said mount, at least two of said inserts being fixed to said housing;
   (d) resilient means for urging at least one of said inserts against said mount, and said mount against said two fixed inserts.

2. A lens assembly according to claim 1 wherein at least one of said inserts is arcuately adjustable independently of others of said inserts to any of at least two closely spaced arcuate positions thereby permitting a tilt adjustment of said lens mount.

3. A lens assembly according to claim 2 wherein said housing has at least two arcuately displaced slots and wherein the resilient means is a leaf spring having
   (1) means cooperating with said adjustable insert preventing arcuate movement of said insert independent of said spring and
   (2) a section of said spring which is insertable in one of said slots in said housing for determining the arcuate position of said insert.

4. In an assembly having a lens having an optical axis, a mechanism for displacing at least one lens component of said lens along said optical axis to effect focusing of said lens, in which said lens component is supported by a lens mount having screwthreads on an outside surface thereof, said mechanism comprising
   a lens housing for receiving said lens mount, said lens housing having at least two arcuately displaced slots;
   at least three inserts arcuately spaced inside said housing, said inserts having screwthreads adapted to cooperate with the screwthreads of said mount;
   a leaf spring positioned between said housing and at least one of said inserts for urging said insert against said mount and said mount against at least two of the other inserts, said leaf spring having means cooperating with said urged insert preventing arcuate movement of said insert independent of said spring and said leaf spring having a protrusion which is insertable in one of said slots in said housing for determining the arcuate position of said insert, thereby permitting a tilt adjustment of said mount.

5. In a lens assembly having a lens having an optical axis, a mechanism for displacing at least one lens component of said lens along said optical axis to effect focusing of said lens, said lens component being supported by a lens mount having screwthreads on an outside surface thereof, said mechanism comprising
   a lens housing for receiving said lens mount;
   at least three arcuately spaced inserts positioned between said housing and the outside surface of said mount, said inserts having screwthreads which cooperate with the screwthreads of said mount, at least two of said inserts being fixed to said housing; and
   resilient means positioned between said housing and at least one of said inserts holding said insert against said mount and said mount against said two fixed inserts.

References Cited

UNITED STATES PATENTS

| 1,331,174 | 2/1920 | Wescott | 95—45 |
| 3,297,392 | 1/1967 | Ballmer | 350—252 |

FOREIGN PATENTS

| 15,196 | 6/1912 | England. |
| 1,155,730 | 12/1957 | France. |

DAVID SCHONBERG, *Primary Examiner.*

MICHAEL J. TOKAR, *Assistant Examiner.*

U.S. Cl. X.R.

95—45